US008518242B2

(12) United States Patent
Negiz et al.

(10) Patent No.: US 8,518,242 B2
(45) Date of Patent: Aug. 27, 2013

(54) FIBROUS SUBSTRATE-BASED HYDROPROCESSING CATALYSTS AND ASSOCIATED METHODS

(75) Inventors: Antoine Negiz, Wilmette, IL (US); Hui Wang, Des Plaines, IL (US)

(73) Assignee: UOP LLC, Des Plaines, IL (US)

(*) Notice: Subject to any disclaimer, the term of this patent is extended or adjusted under 35 U.S.C. 154(b) by 301 days.

(21) Appl. No.: 13/116,074

(22) Filed: May 26, 2011

(65) Prior Publication Data
US 2012/0298554 A1 Nov. 29, 2012

(51) Int. Cl.
*C10G 47/10* (2006.01)

(52) U.S. Cl.
USPC ......... 208/111.01; 501/35; 501/94; 501/95.1; 423/326; 423/327.1; 423/328.1; 502/63; 502/67; 502/68; 502/69; 502/79; 502/240; 502/263; 502/355

(58) Field of Classification Search
USPC .................. 501/35, 39, 95.1; 502/63, 67–69, 502/77–79, 240, 263, 355; 423/26, 327.1, 423/328.1; 208/111.01
See application file for complete search history.

(56) References Cited

U.S. PATENT DOCUMENTS

| | | | |
|---|---|---|---|
| 3,130,007 A | 4/1964 | Breck | |
| 3,308,069 A | 3/1967 | Wadlinger et al. | |
| 3,844,737 A * | 10/1974 | Macriss et al. | 95/93 |
| RE28,341 E | 2/1975 | Wadlinger et al. | |
| 4,310,440 A | 1/1982 | Wilson et al. | |
| 4,440,871 A | 4/1984 | Lok et al. | |
| 4,554,143 A | 11/1985 | Messina et al. | |
| 4,752,651 A | 6/1988 | Kaiser | |
| 4,760,040 A | 7/1988 | Sato et al. | |
| 4,793,984 A | 12/1988 | Lok et al. | |
| 4,853,197 A | 8/1989 | Wilson et al. | |
| 4,943,366 A | 7/1990 | Fischer et al. | |
| 5,110,783 A | 5/1992 | Yamaguchi et al. | |
| 5,191,141 A | 3/1993 | Barger et al. | |
| 5,350,501 A | 9/1994 | Ward | |
| 5,358,633 A | 10/1994 | Dai et al. | |
| 5,433,841 A | 7/1995 | Ichikawa | |
| 2007/0131582 A1 | 6/2007 | Lai et al. | |
| 2009/0084709 A1 | 4/2009 | Choi | |
| 2009/0200202 A1 | 8/2009 | Grande et al. | |
| 2009/0275788 A1 | 11/2009 | Bedard et al. | |

OTHER PUBLICATIONS

Pradhan, A. R. et al. (2000). J. Am. Chem. Soc., 122, 404-405.*
Ge et al.; (1982) "Study of Fibrous Alumina As Catalyst Support for the Selective Hydrogenation of Pyrolysis Gasolines"; Source: China-Jpn.-U.S. Symp. Heterog. Catal. Relat. Energy Probl., BO1C (1982) 4P 1N$ English Chem. Abstr. Abstr.No. 125156 V99 N.16, 1982.

(Continued)

*Primary Examiner* — Brian McCaig
(74) *Attorney, Agent, or Firm* — Mark Goldberg

(57) ABSTRACT

Catalysts are disclosed comprising fibrous substrates having silica-containing fibers with diameters generally from about 1 to about 50 microns, which act effectively as "micro cylinders." Such catalysts can dramatically improve physical surface area, for example per unit length of a reactor or reaction zone. At least a portion of the silica, originally present in the silica-containing fibers of a fibrous material used to form the fibrous substrate, is converted to a zeolite (e.g., having a $SiO_2/Al_2O_3$ ratio of at least about 150) that remains deposited on these fibers. The fibrous substrates possess important properties, for example in terms of acidity, which are useful in hydroprocessing (e.g., hydrotreating or hydrocracking) applications.

5 Claims, 5 Drawing Sheets

(56) References Cited

OTHER PUBLICATIONS

Nakumura et al.; (2001) "Formation mechanism of fibrous silica from a suspension of monodispersed SiO2"; Source: Nippon Seramikkusu Kyokai Gakujutsu Ronbunshi/Journal of the Ceramic Society of Japan, v 109, n 1266, p. 83-88, Feb. 2001 ; ISSN: 09145400.

Corma et al.; (1990) "Aluminum-exchanged sepiolites as components of FCC catalysts"; Source: ACS 200th National Meeting (Washington, DC Aug. 26-31, 1990) ACS Division of Petroleum Chemistry Preprints V35 N.4 786-94 (Aug. 1990), Author affiliation: Universidad Politecnica de Valencia.

* cited by examiner ic # FIBROUS SUBSTRATE-BASED HYDROPROCESSING CATALYSTS AND ASSOCIATED METHODS

FIELD OF THE INVENTION

The present invention relates to catalysts and methods for hydroprocessing feedstocks, including those comprising distillable petroleum derived fractions having a boiling point range which is above that of naphtha (i.e., distillate feedstocks). Representative catalysts comprise a fibrous substrate having silica-containing fibers, in addition to a zeolite deposited on the fibers and formed at least in part by conversion of the silica-containing fibers.

DESCRIPTION OF RELATED ART

Hydroprocessing processes, generally involving reactions between hydrogen and hydrocarbons (including heteroatom-substituted hydrocarbons) are well established and used throughout the refining industry. These processes embrace both hydrotreating, which promotes the beneficial reduction of organic sulfur and nitrogen compounds (desulfurization and denitrification), as well as hydrocracking, which upgrades a feedstock by reducing its molecular weight. Hydroprocessing is conventionally carried out in the presence of a catalyst, in order to activate molecular hydrogen and thereby achieve economically attractive reaction kinetics under favorable conditions of temperature and pressure.

Current hydroprocessing catalysts of commercial significance comprise a metal function (e.g., a combination of metals such as in the case of a cobalt/molybdenum or nickel/molybdenum metal function) and a solid acid component (e.g., a zeolite or amorphous silica and alumina), each of which may be selected to achieve desired performance characteristics for a given application. Important performance criteria are (i) activity, or conversion that is obtained at a particular set of reaction conditions (e.g., temperature, pressure, and residence time, which correlates with the inverse of space velocity), (ii) selectivity, or percentage of the converted product that is a desired product (e.g., naphtha), and (iii) activity stability, or activity loss over time. Activity stability governs the frequency with which a hydroprocessing catalyst must be replaced and/or regenerated, and this parameter therefore significantly affects the overall material and operating costs required in catalytic hydroprocessing processes.

A widely practiced type of hydrotreating involves the hydrodesulfurization of distillate feedstocks. To achieve currently mandated standards for ultra low sulfur diesel and gasoline, hydrotreating is often performed under high severity conditions, including high temperatures and pressures and low space velocities. For example, the ability to upgrade the distillate feedstock known as Light Cycle Oil (LCO), obtained from fluid catalytic cracking (FCC) refinery operations, is of particular interest in view of the limited uses of this low-value material. Distillate feedstocks, including crude oil fractions such as gas oils, are also often subjected to hydrocracking to produce desirable products including diesel fuel, naphtha, and gasoline. For example, U.S. Pat. No. 4,943,366 discloses a hydrocracking process for converting highly aromatic, substantially dealkylated feedstock into high octane gasoline.

Many hydroprocessing processes carry out a combination of hydrotreating and hydrocracking reactions, for example through the use of dual functional catalysts having both a hydrogenation component and a cracking component, corresponding to the metal function and solid acid component, as described above. In terms of the cracking component, the selection of a zeolite versus an amorphous acidic component is based on the desired hydrocracking activity, or degree of conversion of the feedstock to the lower boiling range naphtha product, as opposed to higher boiling range distillate product. Since higher catalyst acidity directionally leads to higher yields of cracked products (i.e., products reduced in molecular weight and boiling point), distillate selectivity is generally improved when the solid acid component of the hydroprocessing catalyst has relatively few acid sites, for example in the case of an amorphous silica alumina or a zeolite having a high silica to alumina molar framework ratio.

Catalyst stability and good mass transfer of the gaseous and liquid reactants (e.g., hydrogen and distillate feedstock) are directionally improved when hydrogen is present in excess of the chemical demand based on hydrotreating and/or hydrocracking reaction stoichiometry. Conventional trickle bed hydroprocessing represents such an operating regime, utilizing a hydrogen-rich gas phase that maintains a high hydrogen partial pressure in the reaction zone. The objective of other processes, for example as described in U.S. Pat. No. 6,881,326, is to reduce the amount of hydrogen introduced, closer to the chemical demand, thereby reducing raw materials and equipment costs. The liquid-rich (e.g., completely liquid phase), hydrogen-depleted environment, however, results in poorer catalyst activity and stability, due to the inability of the gas and liquid phases to wet the catalyst surfaces as effectively.

Conventional hydroprocessing catalysts typically have relevant dimensions (e.g., the diameter of a sphere, cylinder, or lobe of a cylinder) on the order of 1-3 millimeters. Even in a gas-rich operating regime, the art has recognized the importance of mass transfer in hydroprocessing, for example by utilizing relatively complicated catalyst shapes such as trilobes or even tetralobes, compared to typical cylindrical extrudates. There is an ongoing need for hydroprocessing catalysts and associated processes that provide improved performance characteristics, ideally allowing the use of low hydrogen inlet flow rates, such as in liquid phase hydroprocessing, while still exhibiting economically attractive mass transfer rates and activity stability.

SUMMARY OF THE INVENTION

The present invention is associated with the discovery of catalysts comprising fibrous substrates having silica-containing fibers with comparatively smaller diameters, generally from about 1 to about 50 microns, which act effectively as "micro cylinders" to dramatically improve physical surface area, per unit length of a hydroprocessing reactor or reaction zone. The fibers may be loose or otherwise bound, for example, with a suitable forming medium or binder (e.g., silica) into various shapes such as a pellet. The fibers may also be formed into a tow or twisted into a yarn, and either of these multiple-fiber forms may be woven, for example into a cloth, matt, or other textile, or otherwise the fibers may be non-woven.

Aspects of the invention relate to the finding that such fibrous substrates can possess properties that are especially desirable in hydroprocessing applications, when at least a portion of the silica, originally present in the silica-containing fibers, is converted to a zeolite or a non-zeolitic molecular sieve (NZMS) that remains deposited on these fibers. In particular, depending on the composition of the fibers, the type of templating agent used to react with the fibers during synthesis of the catalyst, and the zeolite-forming or NZMS-forming conditions, the acidity of the formed zeolite or NZMS can be tailored to obtain a catalyst having a given level of hydrocarbon cracking activity. This cracking activity is largely a function of the overall catalyst acidity, or concentration of acid sites. In the case of a zeolite, acidity relates to its silica to alumina framework molar ratio (the "$SiO_2/Al_2O_3$ ratio"). Higher ratios are associated with less acidity, lower cracking activity, and greater selectivity to distillate products (e.g., diesel fuel boiling range hydrocarbons) relative to naphtha (e.g., gasoline boiling range hydrocarbons).

Representative zeolite structure types having properties suitable for hydroprocessing include those structure types having multidimensional pores with at least one 10-membered ring (10-MR) or at least one 12-membered ring (12-MR), with exemplary zeolites being Y zeolites, beta zeolites, MFI zeolites, mordenite zeolites, and variants of these zeolites.

According to other embodiments, crystalline non-zeolitic molecular sieves may be formed through conversion of the silica-containing fibers, with such non-zeolitic molecular sieves also having acidity and other properties suitable for hydroprocessing reactions. Representative non-zeolitic molecular sieves include aluminophosphate (ALPO) and silicoaluminophosphate (SAPO) non-zeolitic molecular sieves, which are within the genus of ELAPO non-zeolitic molecular sieves.

Whether a zeolite or NZMS is formed from conversion of silica-containing fibers of a fibrous material, obtaining an acidity that is effective for a given hydroprocessing application can involve modification of the formed solid acid in terms of the acid strength, number, and type(s) of its acid sites. MFI structure type solid acids, for example, can be formed with a $SiO_2/Al_2O_3$ ratio ranging from 20 to infinity, with the upper end of the range corresponding to silicalite (with no alumina) Generally, the $SiO_2/Al_2O_3$ ratio can be varied from as low as about 0.1 to infinity (i.e., at least about 0.1), with typical values being in the range from about 20 to about 5000, and often from about 50 to about 1000. In the case of zeolite Y, this solid acid is typically subjected to any of a number of stabilization treatments, including rare earth metal exchange, streaming, acid or alkali treatment, etc., all of which impact the acidity of the formed zeolite. Such modifications may similarly be performed on the formed zeolite or NZMS, or these modifications may be avoided entirely, according to other embodiments, depending on the selection of the composition of the fibrous material used initially. Therefore, the desired acid functionality may be achieved partially or completely (i.e., without further treatment) by the use of a fibrous material with a given content of metallic cations such as silicon, aluminum, and others.

According to some embodiments of the invention, the formed zeolite may have both silica and alumina that is derived from the silica-containing fibers, for example in the case of fibers containing a minor amount of alumina in comparison to the amount of silica present. According to other embodiments of the invention, an additional source of silica and/or a source of alumina may be used in combination with the silica-containing fibers to adjust the $SiO_2/Al_2O_3$ ratio of the zeolite formed, as required to obtain a catalyst having particular cracking characteristics.

Representative catalysts have favorable cracking activity compared to conventional hydroprocessing catalysts, and, advantageously, exceptional mass transfer characteristics. The latter property results from the significantly higher bulk surface area obtained from the small diameter fibers, relative to conventional hydroprocessing catalyst formulations, for example having spherical or extruded forms with relevant dimensions on the order of several millimeters. Catalysts described herein are therefore especially suitable for hydroprocessing applications in which the hydrogen available in the reaction system is not in great excess of that required chemically for the desired extent of hydrotreating and/or hydrocracking. Such applications include hydroprocessing in the liquid phase, in which the hydrogen contained in the reaction system (reactor or reaction zone) is completely dissolved in the hydrocarbon feedstock, or otherwise "liquid-rich" applications in which a significant proportion of the hydrogen is dissolved. In such cases, large trickle bed reactors can be replaced with smaller tubular reactors, and the need for the recovery and recycle of excess hydrogen can be significantly reduced or even eliminated.

Embodiments of the invention are directed to hydroprocessing catalysts and processes utilizing such catalysts, having the advantageous properties as described above. Representative catalysts comprise a fibrous substrate having silica-containing fibers (e.g., a woven textile) and a zeolite or NZMS that is deposited on the fibers and therefore present in the fibrous substrate. Typically, the zeolite or NZMS is present in an amount of at least about 20% by weight (e.g., from about 20% to about 75% by weight), and often at least about 30% by weight (e.g., from about 30% to about 65% by weight), based on the weight of the fibrous substrate. As discussed above, the zeolite or NZMS has framework silica that is derived from the silica-containing fibers, for example upon reaction of the fibers with a templating agent, and optionally the zeolite or NZMS also has framework silica derived from an additional silica source (e.g., not in the form of fibers) that is also reacted with the templating agent, generally in the presence of the silica-containing fibers. According to particular embodiments, the zeolite or NZMS may have both framework silica and framework alumina derived from the silica-containing fibers.

Other embodiments of the invention are directed to methods for hydroprocessing a feedstock, such as distillate feedstock, comprising contacting it with hydrogen in the presence of a catalyst to provide a hydroprocessed product. Representative distillate feedstocks comprise predominantly (e.g., greater than about 50%, greater than about 85%, or greater than about 95%, by weight) of hydrocarbons boiling in the range from 149° C. (300° F.) to 399° C. (750° F.). Often such hydroprocessing methods, which may involve hydrodesulfurization and hydrodenitrification, are accompanied by at least some hydrocracking, such that the hydroprocessed product has a distillation 90% cut point, according to ASTM D-86 that is reduced, relative to the distillation 90% cut point of the feedstock. Particular methods may further comprise fractionating the hydroprocessed product to obtain various product fractions with differing boiling point ranges. For example the hydroprocessed product may be fractionated to separate a naphtha fraction and a diesel fuel fraction, each having an organic sulfur content of less than about 10 ppm by weight, as a result of hydrotreating reactions.

Yet further embodiments of the invention are directed to methods of making catalysts as described herein. Representative methods comprise contacting a fibrous material having silica-containing fibers with a templating agent (e.g., an organoamine such as triethylamine or an organoammonium hydroxide such as tetraethylammonium hydroxide), under zeolite-forming conditions or NZMS-forming conditions of time and temperature, to convert a portion of silica present in the silica-containing fibers of the fibrous material to framework silica of a zeolite (e.g., having an MFI or mordenite structure type) or NZMS. According to particular embodiments, the zeolite or NZMS is formed by contacting the fibrous material with vapors of the templating agent, for example by positioning the fibrous material separate from (e.g., above) a solution of the templating agent and allowing only vapors of the templating agent to flow through the fibrous material, upon sufficient heating of the solution. The conversion of at least a portion of the fibrous material to a zeolite or NZMS results in a fibrous substrate as described above, having the formed zeolite or NZMS deposited thereon. According to other embodiments, the fibrous material may be pretreated, for example with an acid-leach treatment and/or by calcination, to modify the material surface and/or remove impurities, prior to the formation of the zeolite or NZMS (i.e., prior to contacting the fibrous material with the templating agent). According to other embodiments, the resulting fibrous substrate, comprising unreacted silica-containing fibers and a zeolite or NZMS deposited on the fibers, may be calcined. One or more catalytic constituents (e.g., a metal, including noble metals) may be added to the fibrous substrate to provide a catalyst comprising the fibrous substrate and catalytic constituent(s).

These and other embodiments, and their associated advantages, relating to the present invention are apparent from the following Detailed Description.

DETAILED DESCRIPTION

Figure 1:
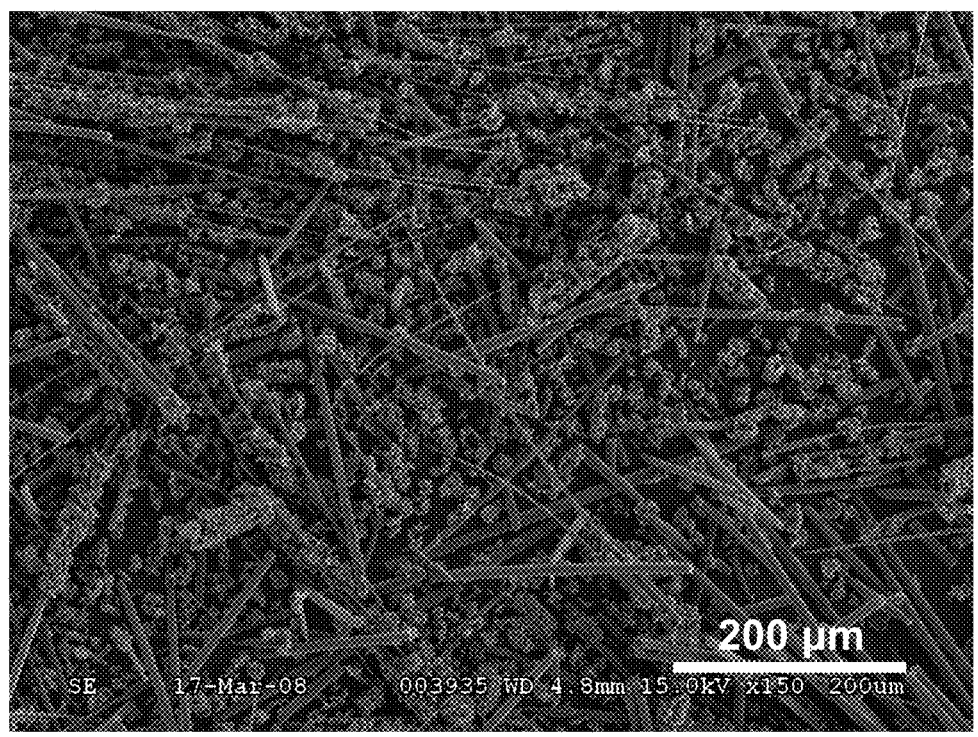
FIG. 1 is a scanning electron microscope (SEM) image, on a 200 micron (μm) scale, of silica-containing fibers having zeolite crystals with an MFI structure type deposited thereon.

Aspects of the invention relate to catalyst formulations based on metal oxide-containing fibers, comprising a zeolite or a non-zeolitic molecular sieve (NZMS) that is deposited on the fibers and that is formed from components of these fibers (e.g., a zeolite having silica and alumina in its framework, either or both of which metal oxides were originally present as components of the metal oxide-containing fibers). The catalysts are prepared with a fibrous material having the metal oxide-containing fibers, and preferably silica-containing fibers. The fibrous material is converted to a fibrous substrate, having, in addition to the metal oxide-containing fibers, zeolite or NZMS that is formed by the reaction of these fibers with a suitable templating agent, as described in greater detail below. The substrate may be present in the catalyst support (referring to the finished catalyst but not including added catalytic constituents such as metals, for example noble metals) in an amount of up to 100%, in which case the support would consist of the fibrous substrate. According to other embodiments, for example when a forming medium is present in the support, the fibrous substrate may be present in the support in an amount ranging from about 10% to about 99% by weight, and often from about 50% to about 90% by weight. Representative forming media include boehmite, hydrous titania and $TiO_2$, hydrous zirconia and $ZrO_2$, gamma alumina, alpha alumina, silica, clays, natural and synthetic polymeric fibers, polymeric resins, and solvent- and water-soluble polymers. Methods for the formation of zeolites, as described herein, from fibrous materials, also apply to the formation of non-zeolitic molecular sieves, and particularly aluminophosphate (ALPO) and silicoaluminophosphate (SAPO) non-zeolitic molecular sieves.

Catalysts described herein utilize fibers having an average diameter generally in the range from about 0.5 to about 100 microns (μm), typically in the range from about 1 to about 50 μm, and often in the range from about 1 to about 30 μm, which are significantly smaller compared to representative dimensions of conventional hydroprocessing catalysts that are normally on the order of several millimeters. The presence of the solid acid component (e.g., a zeolite or NZMS), which provides cracking activity, on such small diameter fibers provides a substrate having overall very desirable mass transfer characteristics, particularly with respect to its use in catalyst formulations for hydroprocessing in a liquid-rich regime (e.g., liquid-phase hydroprocessing).

Fibrous Starting Materials

Representative fibrous materials, used initially as starting materials for forming the fibrous substrates, comprise silica-containing fibers. Other components of the silica-containing fibers, which may be present in relatively small amounts relative to the amount of silica, include oxides of aluminum, boron, and calcium. Fibers containing these other metal oxide components, when subjected to zeolite-forming conditions as described below, can provide, in the formed zeolite or NZMS crystals of the resulting fibrous substrate, the same metal oxide components. A "fiber" refers to an elongate body the length dimension of which is much greater that the transverse dimensions of width and thickness, or diameter (in the case of a fiber having a circular cross section). Accordingly, the term fiber includes monofilament, multifilament, fibrillated fiber, ribbon, strip, staple and other forms of chopped, cut or discontinuous fiber having a regular or irregular cross-section. The term "fiber" includes a plurality of any of the foregoing or a combination thereof. A yarn and a tow, for example, refer to continuous strands comprised of many fibers or filaments, with a yarn being used to designate that the fibers are twisted. The cross-sections of fibers may vary, with representative cross sections being circular, flat, or oblong, and preferably circular or substantially circular. They also may be of irregular or regular multi-lobal cross-section having one or more regular or irregular lobes projecting from the linear or longitudinal axis of the fiber.

Fibers of the fibrous materials used to prepare catalysts described herein may be woven or non-woven. Non-woven fibers may be, for example, unidirectionally aligned or randomly felted, and these fibers are typically in the form of non-woven blankets, bulk fiber, fiber tow, fiber yarn, chopped fiber, etc. Woven fibers may be in the form of, for example, a cloth, a matt, a fabric, a tape, a textile, a woven composite, or a mesh, any of which may have a number of possible weave patterns. Woven fibers or non-woven fibers of the fibrous materials can be in flexible or rigid forms, depending upon the nature of their construction and the materials employed. A felt is a non-woven network of randomly oriented fibers, at least one of which is preferably a discontinuous fiber, such as a staple fiber. Preferred fibers of the fibrous material are silica-containing fibers, with representative fibrous materials being amorphous silica woven fabrics, woven tapes, textiles, non-woven blankets, or woven tapes. Representative fibrous materials having silica-containing fibers in these and other forms include Refrasil® silica products (Garden, Calif., USA).

Other representative fibrous materials having silica-containing fibers are fiberglass compositions, with exemplary glass types of the fibers being used including E-glasses, boron-free E-glasses, S-glasses, R-glasses, AR-glasses, rare earth-silicate glasses, Ba—Ti-silicate glasses, nitrided glasses such as Si-AI-O—N glasses, A-glasses, C-glasses and CC-glasses. Each of these glass types are known in the art, particularly with respect to the compositions they embrace. AR-glass, for example, generally contains basic oxide type glass network modifiers in substantial amounts, often 10% by weight or more, of the total glass composition. These basic oxide network modifiers include oxides of Zr, Hf, Al, lanthanides, and actinides, as well as alkaline earth oxides (group 2) and alkali oxides (group 1). A-type glass generally contains either acidic or basic oxide type glass network modifiers, including oxides of Zn, Mg, Ca, Al, B, Ti, Fe, Na, and/or K. In the case of basic network modifiers, the amount incorporated is generally less than 12% by weight. E-type glass, which includes non-leached E-type glass, generally contains either acidic or basic oxide type glass network modifiers, including oxides of Zn, Mg, Ca, Al, B, Ti, Fe, Na, and/or K. In the case of basic network modifiers, the amount incorporated in non-leached E-type glasses tends to be less than 20% by weight.

Acid Leach Treatment of the Fibrous Material

The surface of the fibrous material, and particularly a glass material, may be activated by an acid leach treatment involving contacting it with an acid suitable for removing a desired ionic species in a substantially heterogeneous manner across the substrate surface. This removal is generally achieved without significant erosion of the fiber network and/or significant creation of micropore structure, either on or below the surface. The acid may be organic or inorganic, with inorganic acids being preferred. Representative acids include nitric acid, phosphoric acid, sulfuric acid, hydrochloric acid, acetic acid, perchloric acid, hydrobromic acid, chlorosulfonic acid, trifluoroacetic acid and mixtures thereof.

An appropriate strength of an acid solution for use in an acid leach treatment depends on the properties of the fibrous network, for example its affinity for ion(s) to be removed (e.g., from a glass network), its strength after certain network ions are removed, and other properties. The strength or concentration of an acid solution used in an acid leach treatment ranges generally from about 0.5% to about 50%, typically from about 1% to about 25%, and often from about 2.5% to about 10%, by weight. Depending on the acid strength and composition of the fibrous material, the acid leach treatment conditions may be varied to target the removal or maintenance of various species of the fibrous material. A mild acid leach, for example, may be used to substantially maintain the minor amounts of B, Ca, Si, and/or Al.

Other acid leach conditions, including heat treatment conditions (e.g., acid leach heating temperature, acid leach heating time and acid leach mixing conditions), for the acid leach treatment are selected in view of the type and strength of the acid used and the properties of the fibrous network. Representative acid leach heating temperatures are generally from about 20° C. (68° F.) to about 200° C. (392° F.), typically from about 40° C. (104° F.) to about 120° C. (248° F.) and often from about 60° C. (140° F.) to about 95° C. (203° F.). Representative acid leach heating times (i.e., the duration of heating when the desired heating temperature, of the substrate and the acid, is achieved) are generally from about 15 minutes to about 48 hours and typically from about 30 minutes to about 12 hours. Representative acid leach mixing conditions (i.e., during the ion exchange heating time) for the substrate and the acid include continuous or intermittent mixing. Mixing may be performed by hand (e.g., by shaking) or may be automated (e.g., tumbling, rolling, shaking, etc.).

Following the acid leach treatment, the acid-leached fibrous network is preferably isolated from the acid by any suitable method, including filtering, centrifuging, decanting, etc. The material is generally washed with one or more suitable rinsing liquids, such as deionized water and/or a suitable water-soluble organic solvent (e.g., methanol, ethanol, or acetone) and then dried at room temperature or elevated temperature (e.g., up to about 150° C. (302° F.)) for a period generally from 1 to 24 hours.

Overall, the acid leach conditions are generally based on a desired degree of modification of surface properties. These properties include the isoelectric point (IEP), as well as the type and degree of surface charge, for example as needed to produce the surface active state desired for either subsequent treatment(s) or for use in the substrate (and ultimately in the catalyst). The significance of the IEP and representative ranges of IEP, as well as a number of other possible methods for modifying the surface properties of the fibrous network, including surface activation, contaminant removal treatment (e.g., by calcination), acid leach treatment (including treatment with chelating agents), back-ion exchange (BIX) treatment, and pH adjustment of both BIX treated and non-BIX treated materials, are taught in detail in US 2009/027578 with respect to catalyst substrates described therein, and these teachings are incorporated herein by reference.

Formation of the Fibrous Substrate

Fibrous substrates of catalysts described herein are formed by contacting the fibrous material as described above, optionally treated with an acid under acid leach conditions as also described above, with a suitable templating agent. Formation of a zeolite or NZMS for example as crystallites, occurs by conversion of a portion of the silica or other metal oxide, present in the fibers, into framework silica or other metal oxide of the zeolite or NZMS. The composition of the fibers of the fibrous material, templating agent, and forming conditions determine the zeolite or NZMS in the fibrous substrate, as well as the zeolite type or NZMS type and its properties. An important property impacting the concentration of acid sites present, for example, is the $SiO_2/Al_2O_3$ ratio. This and other properties may be tailored to the desired, overall acidity of the resulting substrate.

A wide range of zeolites may be formed, where an increasing $SiO_2/Al_2O_3$ ratio correlates with a decreasing concentration of acid sites and a reduction in the cracking activity of the zeolite. Substrates with reduced cracking activity, when used in hydroprocessing, tend to lower the average molecular weight of the molecules (i.e., through hydrocracking of these molecules) in the feedstock to a lesser extent. Therefore, in hydroprocessing applications in which a higher molecular weight hydroprocessed product (e.g., comprising a relatively greater amount of distillate boiling range hydrocarbons compared to naphtha boiling range hydrocarbons) is desired, the $SiO_2/Al_2O_3$ ratio should be directionally increased. According to some embodiments, an additional silica source may be used to increase the $SiO_2/Al_2O_3$ ratio of the formed zeolite, by incorporating into the framework of the formed zeolite both silica derived from the fibrous material and silica derived from the additional silica source. Representative methods for preparing catalysts described herein therefore include contacting both the fibrous material having silica-containing fibers and the additional silica source with the templating agent, under zeolite-forming conditions, to convert portions of silica present in both silica-containing fibers and the additional silica source to framework silica of the zeolite.

Representative silica sources include non-fibrous materials such as colloidal silica sol, silicic acid, sodium silicate, silica gel, or reactive particulate silica (e.g., diatomaceous earth, Hi-Sil, etc.). The silica source can be added to the fibrous material prior to its contacting with the templating agent under zeolite-forming conditions, or otherwise after some initial period of time in which the fibrous material and templating agent have been reacted under these conditions.

Representative zeolites, formed from silica present in the fibrous material, have a $SiO_2/Al_2O_3$ ratio of at least about 20. This corresponds to an atomic silicon to aluminum framework ratio (Si:Al ratio), or of at least about 10. In other embodiments, the zeolite formed from the reaction of the fibrous material and templating agent has a $SiO_2/Al_2O_3$ ratio in the range from about 20 to about 5000, often from about 50 to about 1000. Representative zeolites include those having channels formed from 10 or more ring members (e.g., having 10-membered rings or 12-membered rings), with those having Y, beta, MFI, MEL, and mordenite structure types being representative. The structures of Y zeolite and MFI zeolite are described, and further references are provided, in Meier, W. M, et al., *Atlas of Zeolite Structure Types*, 4$^{th}$ Ed., Elsevier: Boston (1996). Beta zeolite is described, for example, in U.S. Pat. No. 3,308,069 and Re No. 28,341, which are incorporated herein with respect to their description of this material.

The term "Y zeolite" is meant to encompass all crystalline zeolites having either the essential X-ray powder diffraction pattern set forth in U.S. Pat. No. 3,130,007 or a modified Y zeolite (or Y zeolite variant) having an X-ray powder diffraction pattern similar to that described in U.S. Pat. No. 3,130,007 but with the d-spacings shifted somewhat due, as those skilled in the art will realize, to cation exchanges, calcinations, etc., which are generally necessary to convert the Y zeolite into a catalytically active and stable form. An exemplary Y zeolite is prepared by the four-step procedure taught in U.S. Pat. No. 5,350,501, which procedure is hereby incorporated by reference.

Specific examples of MFI zeolites are ZSM-5 and silicalite. An example of an MEL zeolite is ZSM-11 which is known in the art. Other representative zeolites have a mordenite structure type (MOR). Further representative zeolites having 10-membered ring pores as in the MFI and the MEL structure types, include zeolites having the structure types NES, SFG, MWW, and ITH. Specific examples of siliceous zeolites include NU-87 and SSZ-37, having the NES structure type; SSZ-58, having the SFG structure type; MCM-22 and UZM-8, having the MWW structure type; and ITQ-13, having the ITH structure type. All of the above zeolite structure types are described by Meier, W. M, et al., as cited above.

Non-zeolitic molecular sieves may also be formed from metal oxides present in the fibers of the fibrous substrate starting material. These include ELAPO molecular sieves which have the proper level of acidity and are embraced by an empirical chemical composition, on an anhydrous basis, expressed by the formula:

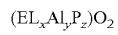

$(EL_xAl_yP_z)O_2$ where EL is an element selected from the group consisting of silicon, magnesium, zinc, iron, cobalt, nickel, manganese, chromium and mixtures thereof, x is the mole fraction of EL and is often at least 0.005, y is the mole fraction of aluminum and is at least 0.01, z is the mole fraction of phosphorous and is at least 0.01 and x+y+z=1. When EL is a mixture of metals, x represents the total amount of the element mixture present. The preparation of various ELAPO molecular sieves are well known in the art and may be found in U.S. Pat. No. 5,191,141 (ELAPO); U.S. Pat. No. 4,554,143 (FeAPO); U.S. Pat. No. 4,440,871 (SAPO); U.S. Pat. No. 4,853,197 (MAPO, MnAPO, ZnAPO, CoAPO); U.S. Pat. No. 4,793,984 (CAPO); U.S. Pat. No. 4,752,651 and U.S. Pat. No. 4,310,440; all of which are incorporated by reference. Representative ELAPO molecular sieves include ALPO and SAPO molecular sieves.

The zeolite or NZMS formed according to the synthesis methods described herein is normally obtained as crystallites that are deposited on the fibers of the fibrous substrate. Crystallites refer to individual crystals of the zeolite or NZMS, as opposed to agglomerated crystals or agglomerated particles. The average crystallite size may be determined from Scanning Electron Microscopy (SEM) analysis. In general, the zeolites or non-zeolitic molecular sieves formed according to the methods and present in the catalysts, as described herein, advantageously have an average crystallite size of generally less than about 10 microns (μm) (e.g., from about 0.3 μm to about 10 μm), and typically less than about 5 μm (e.g., from about 0.5 μm to about 5 μm). These small crystallite sizes provide good diffusion characteristics in the resulting fibrous substrate and hydroprocessing catalyst.

Representative templating agents, which are contacted with the fibrous material having silica-containing fibers, include organoamines such as trialkylamines Organoamines refer to compounds based on ammonia but having at least one of the three hydrogen atoms substituted with alkyl groups. Examples include n-butylamine; n-propylamine; triethylamine; tributylamine; ethyl, di-propylamine, etc. Also useful as templating agents are the corresponding organoammonium salts such as trialkylammonium salts. Examples include trialkylammonium hydroxide, tetraalkylammonium hydroxide, and their halide salts (e.g., trialkylammonium chloride, bromide, or iodide; or tetraalkylammonium chloride, bromide, or iodide). Generally, the templating agent may be selected from a number of possible compounds having an organic cation, which instead of a quaternary ammonium ion, may alternatively be a diquaternary ammonium ion, a protonated amine, a protonated alkanolamine, or a quaternized alkanolammonium ion. Non-limiting examples of quaternary ammonium ions are tetramethyl-, ethyltrimethyl-, methyltriethyl, diethyldimethyl-, trimethylbutyl-, and trimethylpropyl-ammonium ions. Non-limiting examples of diquaternary ammonium ions are hexamethonium, pentamethonium, octamethonium, decamethonium, dimethylene bis(trimethylammonium), trimethylene bis(trimethylammonium), methylene bis(trimethylammonium) and tetramethylene bis(trimethylammonium).

Conversion of the fibrous material into the fibrous substrate comprising a zeolite or NZMS, for example present as crystallites that are adhered to surfaces of the silica-containing fibers of the substrate, involves contacting the fibrous material, and optionally additional sources of silica, alumina, and/or other metal oxides, with the templating agent under suitable zeolite-forming or NZMS-forming conditions. The forming conditions generally involve exposure of the fibrous material and templating agent to elevated temperature for a sufficient reaction time. In some cases, contact of the fibrous material with only vapors of the templating agent, which may be achieved, for example, by maintaining the fibrous material above a liquid level of the templating agent, is effective. Otherwise, the liquid and solid phases may be contacted directly. Representative forming conditions include a contacting temperature (between the fibrous material, templating agent, an optionally additional sources of silica and/or alumina) generally from about 20° C. (68° F.) to about 250° C.

(482° F.), typically from about 40° C. (104° F.) to about 220° C. (428° F.), and often from about 60° C. (140° F.) to about 200° C. (392° F.). Representative zeolite-forming or NZMS-forming conditions also include heating times (i.e., the duration of heating when the desired heating temperature of the fibrous material, templating agent, and optional source(s) is achieved) are generally from about 1 hour to about 10 days and typically from about 12 hours to about 10 days.

The fibrous substrate, having silica-containing fibers as well as the formed crystallites or zeolite or NZMS, deposited on the fibers due to the zeolite forming reaction described above, may be washed with one or more suitable rinsing liquids, such as deionized water and/or a suitable water-soluble organic solvent (e.g., methanol, ethanol, or acetone) and then dried at room temperature or elevated temperature (e.g., up to about 150° C. (302° F.)) for a period generally from 1 to 24 hours. The fibrous substrate, optionally following the addition of catalytically active constituents as described below, may be calcined subsequent to formation of the zeolite or NZMS, to remove residual templating agent and/or other impurities, or otherwise to convert a catalytically active constituent (e.g., a metal such as nickel) to a desired oxidation state, as by increasing its oxidation number. Effective calcining procedures generally involve heating the fibrous substrate (and any catalytically active constituents deposited thereon) to a temperature from about 300° C. (572° F.) to about 1000° C. (1832° F.), and often from about 400° C. (752° F.) to about 650° C. (1202° F.), for a time (or duration of heating of the fibrous substrate to this temperature) generally from about 1 hour to about 10 hours, and often from about 3 hours to about 9 hours. The heating is normally performed with a flow of oxygen-containing gas (e.g., air, oxygen, or oxygen-enriched air).

In general, the fibrous substrate may be substantially non-porous, meaning that the presence of any micro-, meso- and/or macro-pore volume in the fibrous substrate is not sufficient to adversely affect the performance of the hydroprocessing catalyst. Techniques for determining the extent of micro-, meso- and/or macro-pore volume are described in detail in US 2009/0275788, hereby incorporated by reference with respect to the teachings of surface area measurement according to the methods of (1) $N_2$ BET (based on thermal $N_2$ adsorption/desorption) according to ASTM D3663-03, ("$S.A._{N2-BET}$"), (2) Kr BET (based on thermal Kr adsorption/desorption) according to ASTM D4780-95 ("$S.A._{Kr-BET}$"), and (3) sodium chemisorption surface area, which is characterized as the $S.A._{Na}$ rate of change (based on change vs. time in NaOH titrant) according to the analytical method described by R. Iler in CHEMISTRY OF SILICA, John Wiley & Sons (1979) at p. 203 and 353 ("$SARC_{Na}$"). Representative fibrous substrates have a surface area, as measured by $S.A._{N2-BET}$ or $S.A._{Kr-BET}$, in the range from 0.01 $m^2$/g to 10 $m^2$/g. According to preferred embodiments, in addition to meeting this surface area, representative fibrous substrates have a $SARC_{Na}$ of 0.5 or less. These preferred fibrous substrates with an $SARC_{Na} \leq 0.5$ will be substantially non-porous as defined herein, provided that the $S.A._{N2-BET}$ or $S.A._{Kr-BET}$ is also in a range from about 0.01 $m^2$/g to about 10 $m^2$/g. When these surface area parameters are satisfied, to the extent the substrate has any micropore, mesopore and/or macropore volume, this volume has insufficient pore concentration, distribution and/or type to adversely affect the hydroprocessing performance of the resulting catalyst composition.

Addition of Catalytically Active Constituents

The fibrous substrate, containing the zeolite crystallites or NZMS crystallites, as a result of forming reactions described above, may be subjected to impregnation with one or more catalytically active constituents to provide the hydroprocessing catalyst. Representative catalytically active constituents include at least one Group VIII metal, such as iron, cobalt, and nickel (e.g., cobalt and/or nickel) and/or at least one Group VI metal, such as molybdenum and tungsten. A representative hydroprocessing catalyst therefore comprises, as a catalytically active constituent, a metal selected from the group consisting of nickel, cobalt, tungsten, molybdenum. Catalytically active constituents also include mixtures of these metals (e.g., a mixture of cobalt and molybdenum). Catalytically active constituents further include noble metals (e.g., ruthenium, rhodium, palladium, silver, osmium, iridium, platinum, rhenium, and/or gold). Good results are often obtained with a combination of two metals, with exemplary catalysts comprising either nickel or cobalt being paired with either tungsten or molybdenum.

The catalytically active constituent(s) may be deposited onto the fibrous substrate (which also includes, for example, the zeolite crystallites as a result of their formation at least partly from the silica originally present in the silica-containing fibers as described above), by contacting the fibrous substrate with a solution, such as an aqueous ion exchange solution, of the constituent(s). Representative embodiments of the invention therefore comprise ion exchanging the fibrous substrate, including substrates initially prepared with acid leaching or any other surface treatments or combinations of treatments described above, with one or more ion exchange solutions comprising ions of the catalytically active constituent(s), to provide an ion-exchanged substrate having the catalytically active constituent(s) deposited thereon.

Any salt solutions containing ions of one or more of the catalytically active constituents, or otherwise separate solutions containing ions of different catalytically active constituents, may be used for ion exchange. Ions of the catalytically active constituents are generally considered precursors of these constituents pending, for example, adjustment of their charge by reduction or oxidation, or otherwise pending any other type of post deposition treatment. However, it is also possible that ions of the catalytically active constituent(s) in ion exchange solution(s) may be catalytically effective in their precursor state, as deposited on the fibrous substrate. Suitable catalytically active constituent ions are capable of displacing ions on the fibrous substrate. Otherwise, the catalytically active constituent ions have a charge affinity for this substrate. Suitable ion exchange solutions are generally salt solutions comprising cations of the catalytically active constituent(s) and possibly other cations (e.g., ammonium ions), as well as charge-balancing counterions (e.g., anions such as nitrate, hydroxide, halides, oxyanions, etc.). Representative ion exchange solutions for depositing (through ion exchange) the catalytically active constituent(s) onto the fibrous substrate therefore include solutions comprising metal salts (e.g., metal nitrate salts) of the catalytically active constituent(s).

Generally, the concentration of the salt solutions used for ion exchange treatment to deposit catalytically active constituents onto the fibrous substrate, depend on the type of substrate, the nature of any surface treatments to which the substrate may have been initially subjected, the affinity of the ions of the catalytically active constituents for the substrate surface, and the desired concentrations of the catalytically active constituents on the resulting hydrogenation catalyst. For most types of fibrous substrates, including fiberglass substrates such as those comprising AR, A, or soda-lime glass fibers, the concentration of representative salt solutions is such that the percent by weight (based on solution weight) of ions of a given catalytically active constituent (e.g., $Ni^{+2}$) is from about 1 ppm to about 1000 ppm.

Ions of different catalytically active constituents (e.g., $Ni^{+2}$ ions and $Mo^{+6}$ ions) may be exchanged concurrently, for example in the case of a single ion exchange solution, or otherwise they may be exchanged sequentially, for example in the case of separate ion exchange solutions comprising ions of the different catalytic constituents. In either case, the concentration(s) of the salt solution(s) is/are based on the relative loading desired for each type of catalytic constituent (or catalytic constituent precursor) on the fibrous substrate, considering its relative affinity for each type catalytic constituent. For example, a relatively high affinity for a given catalytic constituent may warrant the use of an ion exchange solution having a relatively low concentration of that constituent, to achieve a given concentration of that constituent on the resulting catalyst. Overall, representative methods for preparing catalysts described herein therefore include ion exchanging the substantially fibrous substrate with one or more ion-exchange solutions comprising ions of the catalytically active constituents to provide an ion-exchanged substrate having the constituent(s) deposited thereon.

As with the acid leach treatment described above, conditions for ion-exchanging also include heat treatment conditions (e.g., ion exchange heating temperature, ion exchange heating time, and ion exchange mixing conditions). These ion exchange heat treatment conditions are selected in view of the type and strength of the ion exchange solution used and the properties of the fibrous substrate. Representative ion exchange heating temperatures are generally from about 20° C. (68° F.) to about 200° C. (392° F.), typically from about 40° C. (104° F.) to about 120° C. (248° F.), and often from about 60° C. (140° F.) to about 110° C. (230° F.). Representative ion exchange heating times (i.e., the duration of heating when the desired heating temperature, of the ion exchange solution and the substrate is achieved) are generally from about 15 minutes to about 48 hours and typically from about 30 minutes to about 12 hours. Representative ion exchange mixing conditions (i.e., during the ion exchange heating time) for the fibrous substrate and the ion exchange solution include continuous or intermittent mixing. Mixing may be performed by hand (e.g., by shaking) or may be automated (e.g., tumbling, rolling, shaking, etc.).

Following ion exchanging of the fibrous substrate, optionally after initially (e.g., prior to formation of the zeolite) having undergone any of the surface methods (e.g., acid leaching) for modifying the surface properties of the fibrous material used to form the substrate, the resulting ion-exchanged substrate is preferably isolated from the ion exchange solution by any suitable method, including filtering, centrifuging, decanting, etc. The ion-exchanged substrate is generally washed with one or more suitable rinsing liquids, such as deionized water and/or a suitable water-soluble organic solvent (e.g., methanol, ethanol, or acetone) and then dried at room temperature or elevated temperature (e.g., up to about 150° C. (302° F.)) for a period generally from 1 to 24 hours.

Ion exchange heat treatment conditions are generally selected in view of the type and strength of the ion exchange solution used and the properties of the fibrous substrate (e.g., affinity of ion(s) to be exchanged into and out of a fibrous network, strength of the fibrous substrate after certain network ions are removed, etc.) and the ion exchange heating time. Overall, the combination of the ion exchange solution strength and heat treatment conditions are suitable for integrating a sufficient amount and distribution of ions of the catalytic constituents on and/or in the fibrous substrate, as necessary for producing a catalyst composition effective for its intended use. Representative hydroprocessing catalysts, while being effective in catalyzing a desired hydrotreating or hydrocracking reaction, advantageously contain relatively small amounts of the catalytically active constituents, for example less than about 1% by weight (e.g., from about 10 ppm by weight to about 1% by weight) of any single one of the catalytically active constituents, or otherwise less than about 1% by weight (e.g., from about 10 ppm by weight to about 1% by weight) of the catalytically active constituents combined. These weight percentages are expressed based on the catalyst weight, including the fibrous substrate and optionally any other catalyst component. According to particular embodiments, the catalyst may comprise less than about 1000 ppm by weight (e.g., from about 100 ppm by weight to about 1000 ppm by weight) of any single one of the catalytically active constituents, or otherwise the catalytically active constituents combined, based on the volatile-free catalyst weight. A volatile-free catalyst sample may be obtained by subjecting the catalyst to drying at 200-350° C. under an inert gas purge or vacuum for a period of time (e.g., 2 hours), so that water and other volatile components are driven from the catalyst.

In alternative embodiments, the catalytic constitutents may be deposited, for example using ion exchange treatment as described above, on the fibrous material prior to formation of the fibrous substrate.

Further Treatments to Adjust Catalyst Properties

Following ion exchange, the ion-exchanged substrate may be further treated to adjust properties of the substrate and/or the catalytic constituents, for example the oxidation state of the catalytic constituents. According to embodiments of the invention, such further treatments may be performed in a reactor designed to carry out hydroprocessing (e.g., in situ in a hydrotreating reactor). Representative treatments following ion exchange include pH adjusting (to adjust surface charge), calcining, oxidizing, reducing, sulfiding, carbiding, nitriding, phosphiding, and boriding, as described in US 2009/0275788, the teachings of which, pertaining to such post ion exchange treatments, are incorporated herein by reference. A preferred treatment following ion exchange is a reduction or reducing step that lowers the oxidation state of one or more of the catalytic constituents. According to particular embodiments of the invention, methods for preparing catalysts described herein comprise reducing the ion-exchanged substrate in the presence of hydrogen under reducing conditions, to provide the catalyst.

Hydroprocessing

Catalysts described herein, comprising a fibrous substrate having silica-containing fibers and a zeolite or NZMS, and generally also comprising one or more catalytically active constituents, are effective in a number of hydroprocessing reactions. These include hydrotreating, which includes hydrogenation, desulfurization, denitrification, and deoxygenation, in order to treat a feedstock comprising hydrocarbons by (i) hydrogenating reactive compounds (e.g., olefins and diolefins) to improve stability and (ii) removing heteroatoms such as sulfur, nitrogen, and oxygen through the conversion of heteroatom-containing hydrocarbons. Other hydroprocessing reactions include hydrocracking in order to upgrade a feedstock comprising hydrocarbons by reducing the average molecular weight of hydrocarbons in the feedstock. This reduction in molecular weight may be evidenced by an increase in the volatility of the hydroprocessed product relative to that of the feedstock. This increase in volatility, for example, may be measured in the hydroprocessed product by a distillation 90% cut point temperature (temperature at which 90% by volume is evaporated according to ASTM D-86) that is reduced, relative to the 90% distillation cut point temperature of the feedstock. Further hydroprocessing reactions include hydroisomerization to increase the degree of branching in the hydroprocessed product, for example to improve the cold flow properties of a diesel fuel fraction.

Representative methods for hydroprocessing a feedstock therefore comprise contacting the feedstock and hydrogen in the presence of a catalyst described herein, under suitable hydroprocessing conditions in a hydroprocessing catalyst bed or zone, to provide a hydroprocessed product. Particular hydroprocessing methods comprise hydrotreating and/or hydrocracking a distillate feedstock. The relative degree of hydrotreating versus hydrocracking reactions depends on the hydroprocessing conditions used, as well as the concentration of acid sites of the catalyst, as discussed above. Aspects of the invention are associated with the advantages of catalyst systems, as described herein, in which catalyst acidity may be tailored to a given application. This may be achieved for example by adjusting the amount of alumina, silica, and/or other metal oxide used in the starting materials (e.g., the fibrous material) for preparing the catalyst. In the case of forming a zeolite, for example, amounts of silica and alumina may be adjusted, which affect the $SiO_2/Al_2O_3$ ratio and consequently the acidity of the resulting zeolite that is formed from these materials.

Representative hydrotreating conditions include an average hydrotreating catalyst bed temperature from about 260° C. (500° F.) to about 426° C. (800° F.), often from about 316° C. (600° F.) to about 426° C. (800° F.), and a hydrogen partial pressure from about 0.4 MPa (60 psig) to about 21 MPa (3000 psig), often from about 6.2 MPa (800 psig) to about 8.3 MPa (1400 psig). In addition to pressure and temperature, the residence time of the distillate feedstock in the hydrotreating catalyst bed or zone can also be adjusted to increase or decrease reaction severity, with lower residence times leading to lower severity and lower conversion levels (e.g., of heteroatom-containing hydrocarbons). The inverse of the residence time is closely related to a variable known as the Liquid Hourly Space Velocity (LHSV, expressed in units of $hr^{-1}$), which is the volumetric liquid flow rate over the catalyst bed divided by the bed volume and represents the equivalent number of catalyst bed volumes of liquid processed per hour. A typical range of LHSV for hydrotreating according to the present invention is from about $0.1\ hr^{-1}$ to about $10\ hr^{-1}$, often from about $0.5\ hr^{-1}$ to about $3\ hr^{-1}$.

Representative hydrocracking conditions include an average hydrocracking catalyst bed temperature from about 260° C. (500° F.) to about 426° C. (800° F.), often from about 316° C. (600° F.) to about 426° C. (800° F.); a hydrogen partial pressure from about 4.1 MPa (600 psig) to about 10.5 MPa (1500 psig), often from about 6.2 MPa (800 psig) to about 8.3 MPa (1400 psig); an LHSV from about $0.1\ hr^{-1}$ to about $30\ hr^{-1}$, often from about $0.5\ hr^{-1}$ to about $3\ hr^{-1}$; and a hydrogen circulation rate from about 2000 standard cubic feet per barrel (337 normal $m^3/m^3$) to about 25,000 standard cubic feet per barrel (4200 normal $m^3/m^3$), often from about 5000 standard cubic feet per barrel (840 normal $m^3/m^3$) to about 15,000 standard cubic feet per barrel (2530 normal $m^3/m^3$).

A distillate feedstock generally refers to a distillable petroleum derived fraction having a boiling point range which is above that of naphtha. Suitable distillate feedstocks that may be obtained from refinery fractionation and conversion operations and that may be hydroprocessed in this manner include middle distillate hydrocarbon streams, such as highly aromatic hydrocarbon streams. Distillate feedstocks to the hydrotreating catalyst bed or zone include distillate hydrocarbons boiling at a temperature greater than about 149° C. (300° F.), typically boiling in the range from about 149° C. (300° F.) to about 399° C. (750° F.), and often boiling in the range from about 204° C. (400° F.) to about 371° C. (700° F.). Representative distillate feedstocks comprise predominantly (e.g., at least 50% by volume, and often from 50% to 99% by volume) hydrocarbons boiling within these representative temperature ranges.

Representative distillate feedstocks include various other types of hydrocarbon mixtures, such as straight-run fractions, or blends of fractions, recovered by fractional distillation of crude petroleum. Such fractions produced in refineries include coker gas oil and other coker distillates, straight run gas oil, deasphalted gas oil, and vacuum gas oil. These fractions or blends of fractions can therefore be a mixture of hydrocarbons boiling in range from about 343° C. (650° F.) to about 566° C. (1050° F.), with boiling end points in other embodiments being below about 538° C. (1000° F.) and below about 482° C. (900° F.). Thus, distillate feedstocks are often recovered from crude oil fractionation or distillation operations, and optionally following one or more hydrocarbon conversion reactions. A distillate feedstock is therefore understood to include a converted hydrocarbon product, such as light cycle oil (LCO), having a boiling range that is representative of distillate fractions. LCO is a highly aromatic, substantially dealkylated, converted hydrocarbon product that is suitable as a distillate feedstock and that is produced during fluid catalytic cracking (FCC) of vacuum gas oils to produce high octane gasoline boiling range hydrocarbons. Other distillate feedstocks may be utilized from any convenient source such as tar sand extract (bitumen) and gas to liquids conversion products, as well as synthetic hydrocarbon mixtures such as recovered from shale oil or coal.

In the case of hydrotreating, the hydroprocessed product (normally after removal of non-condensable gases such as $H_2S$ and $NH_3$) obtained from contacting the feedstock with the catalyst described herein under suitable hydrotreating conditions will have reduced concentrations of sulfur and nitrogen. Conversion levels of organic sulfur and organic nitrogen compounds present in the distillate feedstock generally range from about 30% to about 90%, depending on the refractory nature of the particular types of these compounds and the severity of the particular hydrotreating process. In the case of hydrocracking, the hydroprocessed product is reduced in molecular weight, as a result of cracking reactions. This reduction in molecular weight may be evidenced by an increase in volatility, as determined, for example, by a distillation versus volume curve generated according to ASTM D-86. According to particular embodiments in which hydrocracking occurs to at least some extent, the hydroprocessed product has a 90% distillation cut point temperature that is lower than that of the feedstock.

Further aspects of the invention are associated with the increased mass transfer and decreased diffusion resistance offered by the fibrous substrates described herein. These substrates have an exceptional surface area per unit reactor length, compared to conventional, non-fibrous substrates. This enhances mass transfer, which is especially important in the case of liquid-rich hydroprocessing applications that seek to minimize the hydrogen requirements, in the reactor or reaction zone, as well as equipment sizes. Particular embodiments of the invention are therefore directed to hydroprocessing processes operating in the liquid phase or with only a limited amount of hydrogen being introduced into a hydroprocessing zone, beyond the stoichiometric hydrogen requirement for carrying out the desired extent of hydrotreating and/or hydrocracking reactions. For example, the entire quantity of hydrogen being introduced into the hydroprocessing zone may be dissolved in the feedstock (i.e., present in the liquid phase), or may otherwise generally represent from about 90% to about 600%, and typically from about 100% to about 400%, of the stoichiometric hydrogen requirement. According to other embodiments beneficially associated with only limited hydrogen introduction, the hydroprocessing zone and catalyst may be disposed within a tubular reactor and/or the hydroprocessing process may be conducted in the absence of recycled hydrogen. Therefore, it is possible that only a relatively small make-up hydrogen is used for the desired hydroprocessing reactions. This make-up hydrogen can be introduced in a make-up hydrogen stream of varying purity, for example as a pure hydrogen stream or an available impure hydrogen stream (e.g., obtained from a different refining process such as catalytic reforming) and containing impurities such as light hydrocarbons (e.g., methane), CO, $CO_2$, $H_2S$, $N_2$, or other non-condensable gases.

The hydroprocessed product may be fractionated to recover different boiling range materials for different applications, for example naphtha and diesel fractions, either or both of which typically have a sulfur content of less than about 30 ppm by weight, normally less than about 20 ppm by weight, and often less than about 10 ppm by weight. Depending on product needs, which govern the fractionation conditions, the distillation end point temperature of the naphtha may vary. For example, a relatively light naphtha may be separated from the upgraded hydrocarbon product, having a distillation end point temperature of about 149° C. (300° F.) (e.g., from about 138° C. (280° F.) to about 160° C. (320° F.)). According to other embodiments, a relatively heavy naphtha may be separated, having a distillation end point temperature of about 204° C. (400° F.) (e.g., from about 193° C. (380° F.) to about 216° C. (420° F.)). The naphtha itself may be fractionated into one or more naphtha fractions, for example light naphtha, gasoline, and heavy naphtha, with representative distillation end points being in the ranges from about 138° C. (280° F.) to about 160° C. (320° F.), from about 168° C. (335° F.) to about 191° C. (375° F.), and from about 193° C. (380° F.) to about 216° C. (420° F.), respectively. In any naphtha or naphtha fraction characterized as discussed above with respect to its distillation end point temperature, a representative "front end" or initial boiling point temperature is about 85° C. (185° F.) (e.g., from about 70° C. (158° F.) to about 100° C. (212° F.)).

According to representative embodiments of the invention, the yield of naphtha (having a distillation initial boiling point and/or end point in any of the ranges described above, is generally at least 30% by weight (e.g., from about 30% to about 65% by weight), normally at least about 35% by weight (e.g., from about 35% to about 55% by weight), and often at least about 40% by weight (e.g., from about 40% to about 50% by weight), of the combined yield of naphtha and heavier materials, including diesel fuel.

Overall, aspects of the invention are directed to zeolite-containing and NZMS-containing catalysts comprising a fibrous substrate, as well as processes for making the catalysts and hydroprocessing methods using the catalysts. According to representative embodiments directed to the formation of a zeolite, silica in the framework of the zeolite is derived at least in part from silica-containing fibers used to make the catalysts. Advantageously, the silica to alumina molar ratio of the formed zeolite may be conveniently adjusted during the forming processes to achieve desired properties of the catalyst, including acidity, for a given hydroprocessing application (e.g., hydrotreating or hydrocracking). Those having skill in the art, with the knowledge gained from the present disclosure, will recognize that various changes could be made in these catalysts and processes without departing from the scope of the present disclosure.

The following examples are set forth as representative of the present invention. These examples are not to be construed as limiting the scope of the invention as other equivalent embodiments will be apparent in view of the present disclosure and appended claims.

Example 1

Hydroprocessing Catalyst Substrate Preparation from Silica-Rich Fibrous Material To a 125 milliliter TEFLON® liner, 1.8 grams of ethylenediamine (EDA), 6.0 grams of triethylamine (TEA), and 1.08 grams of DI water were added. A 3.0 gram sample of pre-calcined REFRASIL® (HITCO Carbon Composites, Gardena, Calif.), amorphous silica-based fibrous textile was placed on top of a perforated TEFLON® holder. The textile was rich in silica, with a measured Si content of 46.3% by weight on a volatile-free basis. The amounts of Al, Ti, and Ca present in the textile were approximately 0.6%, 0.5%, and 0.2% by weight, weight, respectively. Smaller amounts of the elements Co, Cr, Cu, Fe, Ga, K, Li, Mg, Mn, Mo, Na, Ni, P, Sb, Sn, Sr, V, Zn, and Zr were also measured. The holder and silica-rich, fibrous textile were then positioned inside the liner such that no direct contact between the liquid and solid fabric could occur, although vapors from the liquid phase could pass through and contact the solid phase. The liner was then sealed inside a reactor from Parr Instrument Company (Moline, Ill., USA) and heated to 175° C. (347° F.) for four days, after which period the reactor was cooled to room temperature and the solid products removed. The recovered solids, now having 20-30% by weight of zeolite crystallites that formed on the silica-containing fibers of the textile, were calcined at 600° C. (1112° F.) for four hours.

Figure 2:
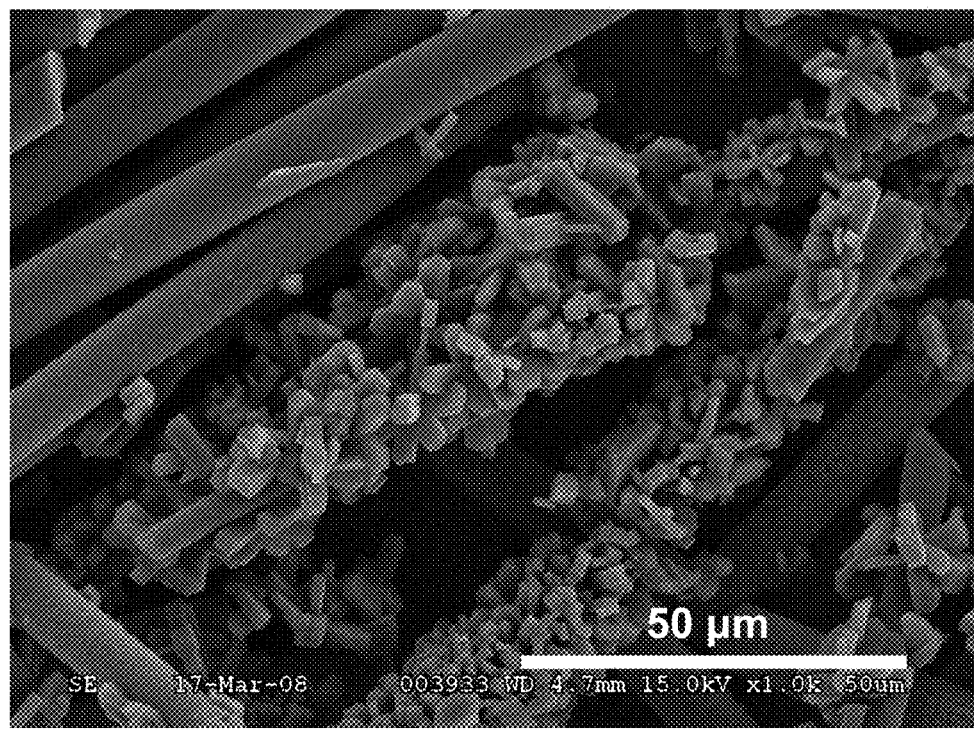
FIG. 2 is an SEM image of the fibrous substrate shown in FIG. 1, but on a 50 μm scale.

To obtain scanning electron microscope (SEM) images, the resulting textile was cut into small pieces and the resulting loose fibers were mounted on an aluminum sample holder and coated with gold. FIGS. 1 and 2 show the SEM images at different levels of magnification. Zeolite crystallites having the MFI structure type formed around the surface of the fibers, which were about 5-10 µm in diameter. The $SiO_2$/$Al_2O_3$ ratio of the zeolite was greater than 150. FIG. 1 illustrates the uniformity of the formed crystallites, and FIG. 2 illustrates that some of these crystallites are smaller than 1 µm in size.

Comparison of Cracking Activities of Different Substrates

The substrate prepared in Example 1, comprising MFI structure type zeolite on a fibrous substrate having silica-containing fibers, was tested for its cracking activity compared to other substrates, including those used for commercial hydroprocessing catalysts, according to a standardized testing protocol. The substrate prepared in Example 1 was referred to as "Catalyst D," while commercial spherical (non-fibrous, non-zeolitic) substrates prepared according to an oil dropping technique were referred to as "Catalyst A" and "Catalyst B." Reference Catalyst A and reference Catalyst B were composed of approximately 35/65 w/w and 75/25 w/w, respectively, of silica/alumina "Catalyst C" was a fibrous textile of 30/70 w/w silica/alumina, without the formed zeolite.

Each of catalysts A-D were subjected to an n-heptane cracking test at atmospheric pressure using an excess of hydrogen. The n-heptane and hydrogen were passed over 250 mg of catalyst or substrate in each test. Cracking performance was evaluated during six distinct periods of operation, referred to as Periods 1-6. Periods 1-3 were conducted at 500, 250, and 75 cc/min of n-heptane flow rate at 500° C. (932° F.)

reaction temperature. Periods 4-6 were conducted at 500, 250, and 75 cc/min of n-heptane flow rate at 600° C. (1112° F.) reaction temperature.

Figure 3:
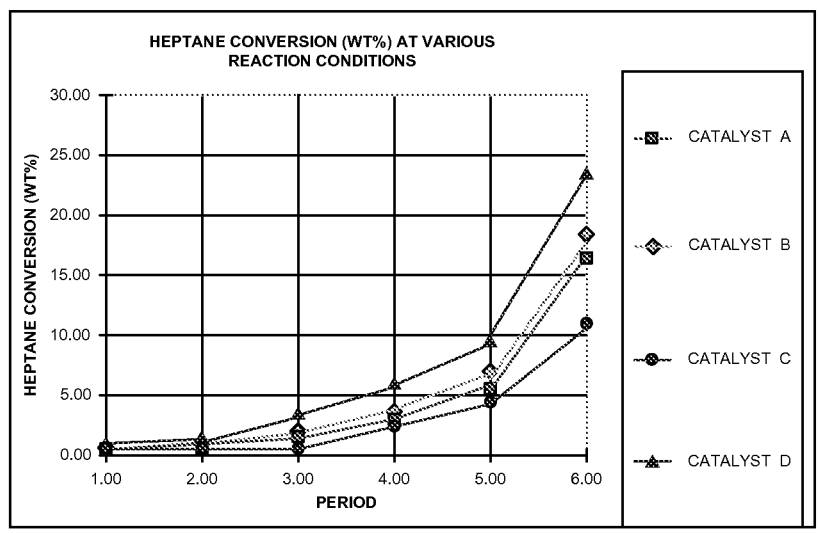
FIG. 3 is a graph showing the performance of a hydroprocessing catalyst described herein and conventional catalysts, in terms of their activity, under various conditions, for cracking n-heptane in a standard screening test.
Figure 4:
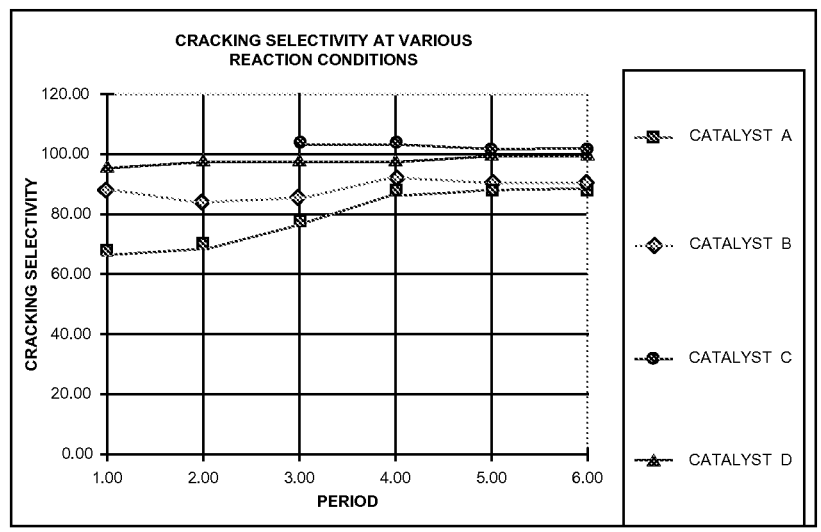
FIG. 4 is a graph showing the performance of the catalysts in the screening test described above with respect to FIG. 3, in terms of the selectivity to cracked products, namely hydrocarbons having a lower molecular weight and boiling point than n-heptane in the hydroprocessing reactor effluent (hydroprocessed product).
Figure 5:
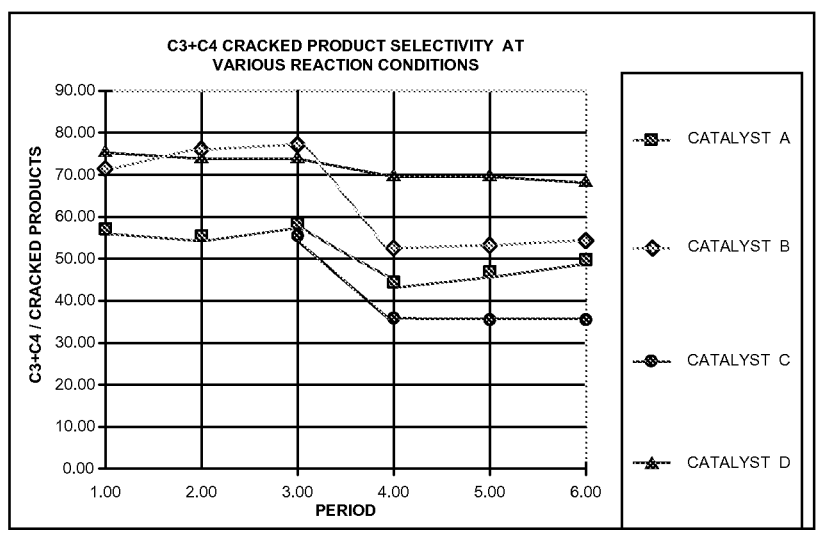
FIG. 5 is a graph showing the performance of the catalysts in the screening test described above with respect to FIG. 3, in terms of the selectivity to the cracked products, $C_3$ and $C_4$ hydrocarbons in the hydroprocessing reactor effluent.

FIGS. 3-5 show the performance data obtained in these n-heptane cracking tests. Catalyst D, representative of the present invention, was the most active, i.e., had the highest n-heptane conversion during each period evaluated. Catalyst C had somewhat lower activity than Catalysts A and B. All catalysts demonstrated greater than 90% selectivity to cracked products, namely hydrocarbons of a lower carbon number than the n-heptane feedstock, as illustrated in FIG. 4. The selectivity of converted products to the particular 3- and 4-carbon hydrocarbons (C3 and C4) is shown in FIG. 5, which demonstrates that Catalysts C and D had selectivities to these hydrocarbons that were very comparable to those of the commercial catalysts or substrates. Catalyst D, representative of the invention, had the highest C3+C4 selectivity, which is associated with Bronsted acidity, whereas Catalyst C exhibited the lowest selectivity. Overall, all of these catalysts, including Catalyst D, were found to have desirable acidity characteristics as required for commercial distillate hydroprocessing applications.

The invention claimed is:

1. A method for hydroprocessing a feedstock, the method comprising contacting the feedstock and hydrogen in the presence of a catalyst comprising a fibrous substrate having silica-containing fibers and a zeolite, wherein the zeolite is present in the fibrous substrate in an amount of at least 20% by weight, to provide a hydroprocessed product.

2. The method of claim 1, wherein the feedstock is a distillate feedstock.

3. The method of claim 2, wherein the distillate feedstock comprises predominately hydrocarbons boiling in the range from about 149° C. (300° F.) to about 399° C. (750° F.).

4. The method of claim 1, wherein the hydroprocessed product has a 90% distillation cut point temperature that is lower than a 90% distillation cut point temperature of the feedstock.

5. The method of claim 1, further comprising fractionating the hydroprocessed product to separate a naphtha fraction and a diesel fuel fraction, each having an organic sulfur content of less than about 10 wt-ppm.

* * * * *